United States Patent [19]

Sato et al.

[11] Patent Number: 4,884,201

[45] Date of Patent: Nov. 28, 1989

[54] AUTOMATIC GEAR CHANGE DEVICE

[75] Inventors: Yuji Sato; Hiromi Kono; Akifumi Tanoue; Yoshiyuki Kimura, all of Higashi-matsuyama, Japan

[73] Assignee: Diesel Kiki Co., Ltd., Tokyo, Japan

[21] Appl. No.: 206,865

[22] Filed: Jun. 13, 1988

[30] Foreign Application Priority Data

Jun. 12, 1987 [JP] Japan .................. 62-146725

[51] Int. Cl.⁴ .................... B60K 41/18; G05B 9/02
[52] U.S. Cl. ...................... 364/424.1; 74/866; 364/431.11
[58] Field of Search .............. 364/424.1, 431.11; 74/866; 192/0.052, 0.092

[56] References Cited

U.S. PATENT DOCUMENTS

| | | | |
|---|---|---|---|
| 4,324,322 | 4/1982 | Sibeud | 192/0.092 |
| 4,361,060 | 11/1982 | Smyth | 192/0.092 |
| 4,531,190 | 7/1985 | Drews et al. | 364/431.11 |
| 4,532,594 | 7/1985 | Hosaka et al. | 364/431.11 |
| 4,558,416 | 12/1985 | Pauwels et al. | 364/431.11 |
| 4,638,690 | 1/1987 | Hattori et al. | 74/866 |
| 4,662,494 | 5/1987 | Wakiya et al. | 192/0.052 |
| 4,677,880 | 7/1987 | Hattori et al. | 192/0.052 |
| 4,698,763 | 10/1987 | Smyth | 364/424.1 |
| 4,722,248 | 2/1988 | Braun | 74/866 |
| 4,765,450 | 8/1988 | Kurihara et al. | 192/0.092 |

Primary Examiner—Parshotam S. Lall
Assistant Examiner—Christopher L. Makay
Attorney, Agent, or Firm—Wenderoth, Lind & Ponack

[57] ABSTRACT

An automatic gear change device includes a first actuator operation control circuit for controlling the operation of a first actuator, a second actuator operation control circuit for controlling the operation of a second actuator, and a main control circuit for controlling the operation of the first and second actuator operation control circuits. The device further includes a communication line interconnecting the first and second actuator operation control circuits to thereby enable data transmission/reception between each operation control circuit and the main control circuit through the other actuator operation control circuit and the communication line.

5 Claims, 6 Drawing Sheets

C/U: MAIN CONTROL CIRCUIT
D/U: OPERATION CONTROL CIRCUIT FOR 1ST OR 2ND ACTUATOR

AUTOMATIC GEAR CHANGE DEVICE

BACKGROUND OF THE INVENTION

1. Field of the Invention:

The present invention relates to an automatic gear change device for controlling the operation of a gear transmission and a clutch in an automotive vehicle.

2. Description of the Prior Art:

One example of automatic gear change devices of the type described is disclosed in Japanese patent laid-open publication No. 61-192954 in which two actuators for manipulating a clutch and a gear transmission are controlled based on the control signals issued from a single control unit. The control unit is mainly composed of a microprocessor operable to determine the control signals based on input signals representing various travelling condition data including the vehicle speed.

The disclosed device is disadvantageous, however, in that the control unit and the actuators have a low compatibility with the corresponding components in an automobile of a different type.

With this difficulty in view, a somewhat successful device has been proposed in Japanese patent application No. 61-154339 filed by the present assignee. The proposed device includes an actuator operation control unit which takes over a portion of the function of the conventional main control unit, and a main control unit for controlling the actuator operation control unit, the actuator operation control unit being disposed adjacent to each actuator for controlling the operation of the latter.

The foregoing device is still unsatisfactory, however, in that since the actuator operation control units are connected to the main control unit by exclusive connecting lines, they are likely to runaway when the exclusive connecting lines are damaged or broken away.

SUMMARY OF THE INVENTION

With the foregoing drawbacks in view, it is an object of the present invention to provide an automatic gear change device which has a safe and reliable operation.

To achieve this object, there is provided according to the present invention an automatic gear change device, comprising:

a gear transmission for transmitting the rotary motion of a driving shaft to a drive shaft while allowing the speed of rotation of the driving shaft to be changed through a plurality of speed ranges;

a clutch for connecting and disconnecting said driving shaft and said gear transmission for transimitting a torque of said driving shaft to said gear transmission;

a first actuator responsive to a first external signal for operating said clutch;

a second actuator responsive to a second external signal for operating said gear transmission;

first actuator operation control means for controlling the operation of said first actuator;

second actuator operation control means for controlling the operation of said second actuator;

main control means for controlling said first and second actuator operation control means; and communication means electrically interconnecting said first actuator operation control means and said second actuator operation control means for permitting electric signals to be transmitted through said communication means between said first and second actuator operation control means.

With this construction, when a communication line extending between the main control means and the first actuator operation control means is damaged or out of order, the first actuator operation control unit is brought into communication with the main control means through the second actuator operation control means held in communication with the main control means and the communication means extending between the second actuator operation control means and the first actuator operation control means. Thus, signal transmission/reception between the first actuator operation control means and the main control means is still possible. Alternatively, when an exclusive communication line extending between the main control means and the second actuator operation control means is damaged or out of order, the second actuator operation control means is brought into communication with the main control means via the first actuator operation control means and the communication means.

Many other advantages and features of the present invention will become manifest to those versed in the art upon making reference to the detailed description and the accompanying sheets of drawings in which a preferred structural embodiment incorporating the principles of the present invention is shown by way of illustrative example.

Figure 3:
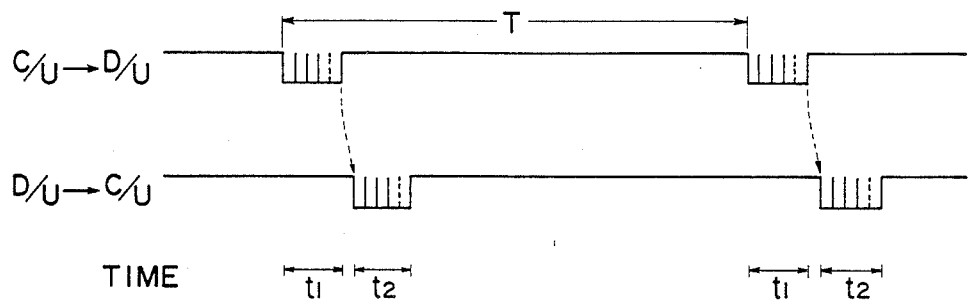
FIG. 3 is a time chart illustrative of data transmission/reception timing between a main control circuit and the first actuator operation control circuit or between the main control circuit and[a second actuator operation control circuit.
Figure 6:
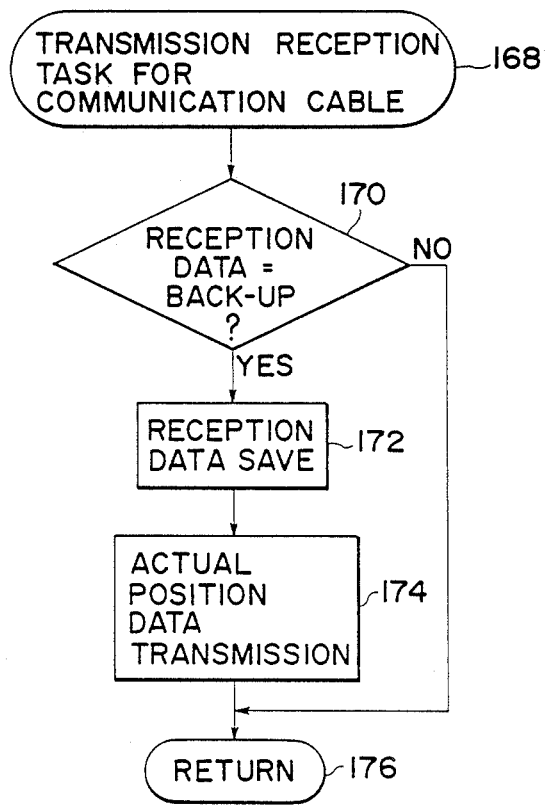
Figure 4:
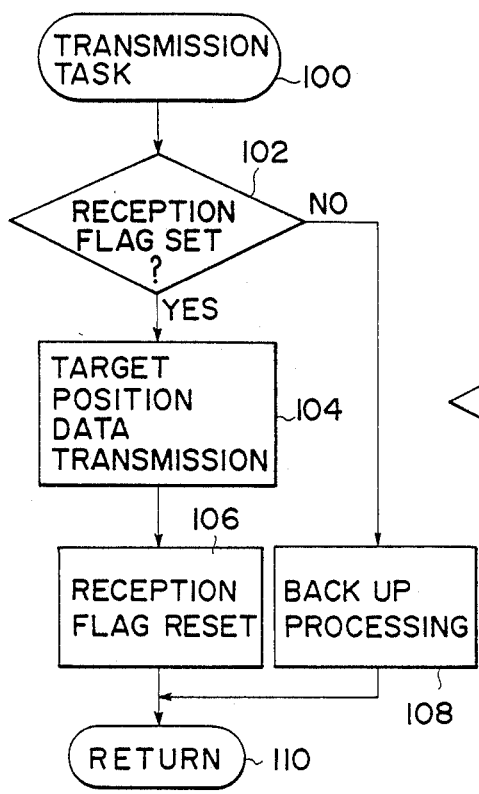
FIG. 4(a) is a flowchart illustrative of a manner in which data transmission is controlled in the main control circuit.
FIG. 4(b) is a flowchart illustrative of a manner in which data reception is controlled in the main control circuit.
Figure 4:
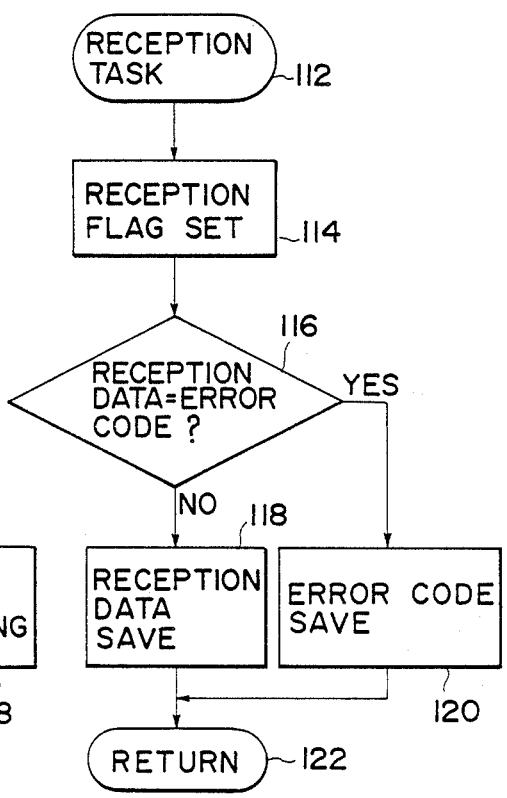
Figure 5:
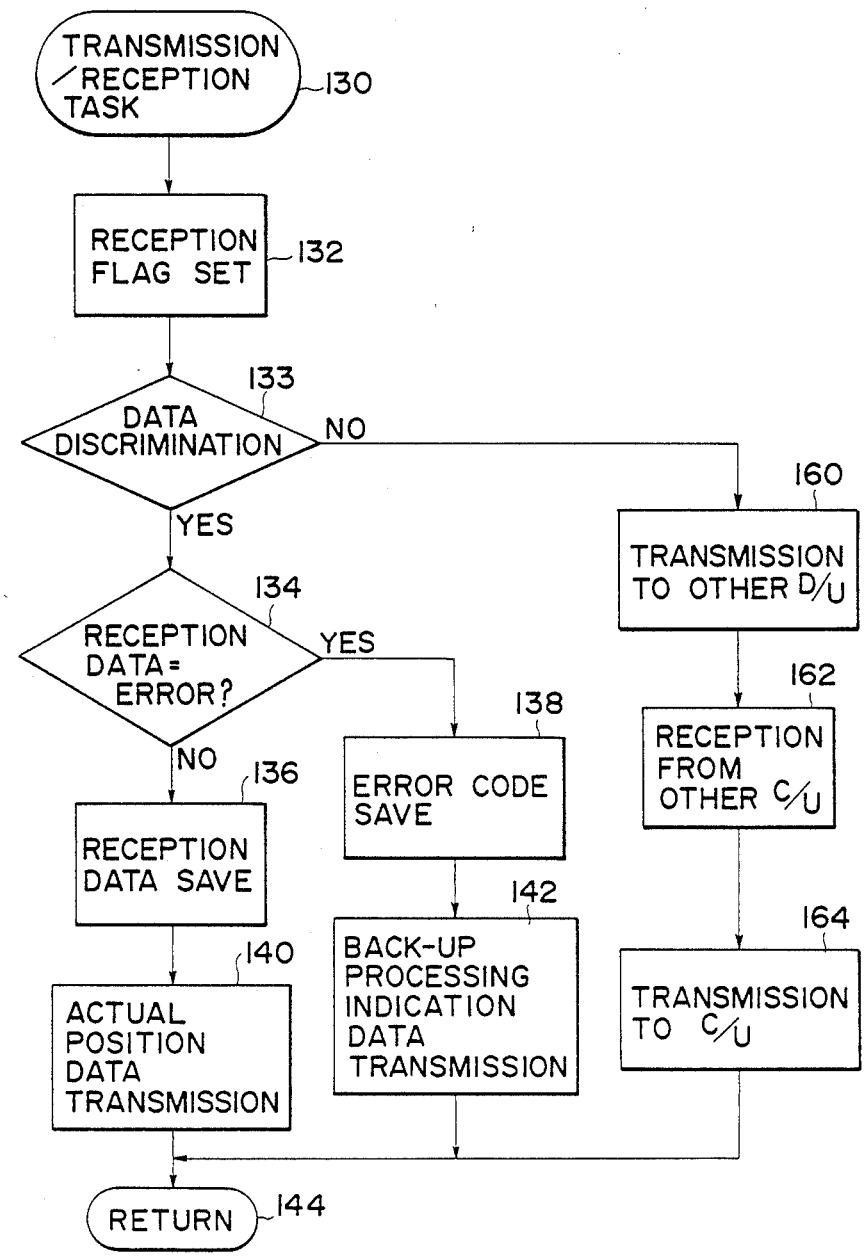
Figure 5:
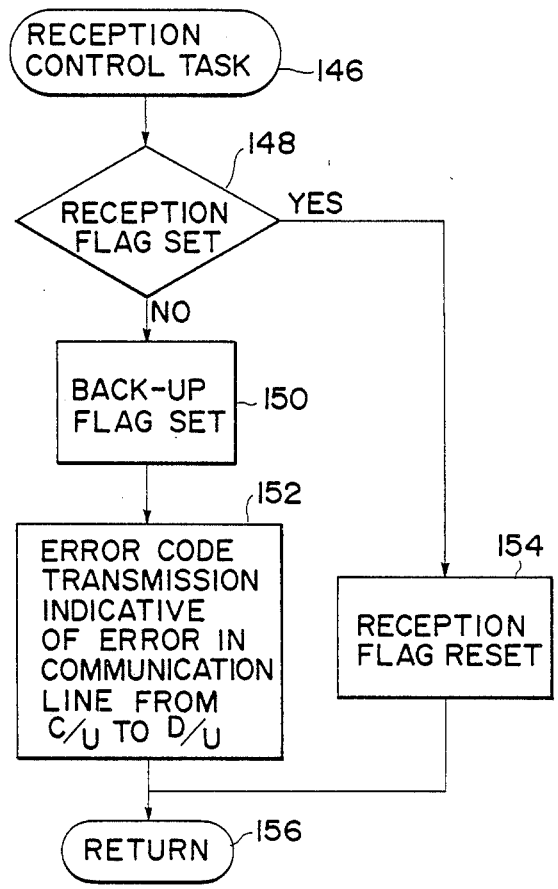

FIGS. 5(a) and 5(b) are flowcharts illustrative of a manner in which data transmission/reception is controlled in the first actuator operation control circuit or in the second actuator operation control circuit; and FIG. 6, appearing with FIG. 3, is a flowchart showing a manner in which data transmission/reception achieved in the first actuator operation control circuit and the second actuator operation control circuit through a communication cable is controlled.

DETAILED DESCRIPTION

A preferred embodiment of the present invention will be described hereinbelow in detail with reference to the accompanying drawings.

Figure 1:
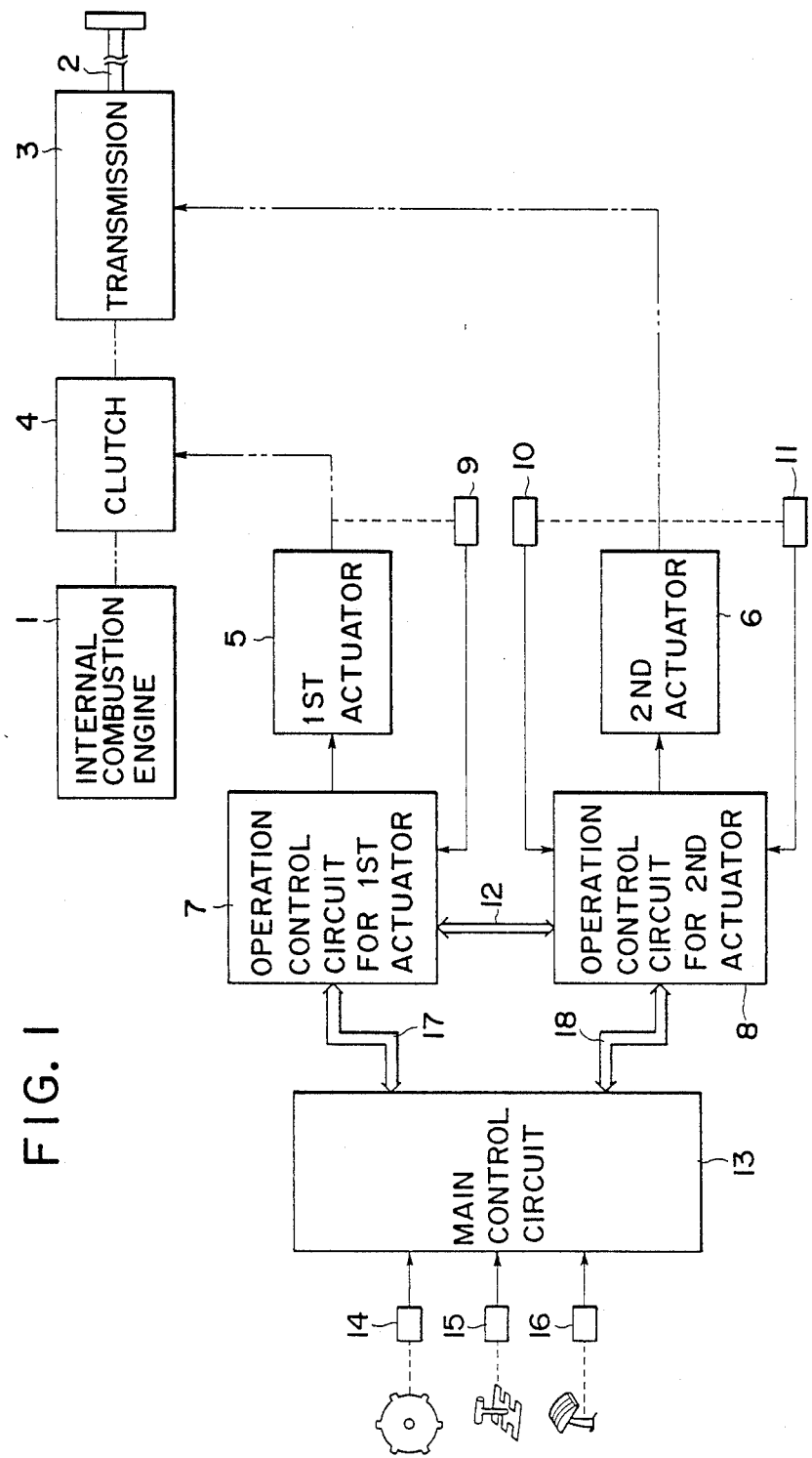
FIG. 1 is a block diagram showing the general construction of an automatic speed change device according to the present invention.

FIG. 1 shows the general construction of an automatic speed change device embodying the present invention. The device includes an internal combustion engine 1, a gear transmission 3 connected with a drive shaft 2 of a motor vehicle, and a clutch 4 connecting and disconnecting the gear transmission 3 and a driving shaft of the internal combustion engine 1. The clutch 4 and the gear transmission 3 are drivingly connected with first and second actuators 5, 6, respectively. The first and second actuators 5,6 are operative in response to electric signals delivered from first and second actuator operation control circuits 7, 8, respectively. The actuators 5, 6 comprise fluid-pressure actuators each composed of a fluid-pressure cylinder, a solenoid-operated valve and the like (not shown).

Each of the first and second actuator operation control circuits 7, 8 is mainly composed of a microprocessor and is constructed such that it produces a control signal required for controlling the clutch or the gear transmission 3 based on data received from a main control circuit 13 (described later in detail) and delivers the control signal to the first actuator 5 or the second actuator 6 to thereby control the operation of the clutch 5 or the gear transmission 3.

There are provided three stroke sensors 9, 10 and 11. The first stroke sensor 9 serves to detect the stroke of a non-illustrated operation member of the first actuator 5. The second and third stroke sensors 10, 11 serve to detect, respectively, the stroke of a non-illustrated operation member of the second actuator 6 movable in a gear-shift direction and the stroke of the operation member of the second actuator 6 movable in a gear-select direction. The output signal of the first stroke sensor is supplied to the first actuator operation control circuit 7 while the outputs of the second and third stroke sensors 10, 11 are supplied to the second actuator operation control circuit 8 so that a feedback control system is completed with respect to each of the first and second actuator operation control circuits 7, 8.

The first actuator operation control circuit 7 and the second actuator operation control circuit 8 are connected together by a communication cable 12. The communication cable 12 permits signal transmission between the main control circuit 13 and the first actuator operation control circuit 7 when a first exclusive communication cable 17 (described later) is damaged or out of order, or between the main control circuit 13 and the second actuator operation control circuit 8 when a second exclusive communication cable 18 (described later) is damaged or out of order.

The main control circuit 13, likewise the first and second actuator operation control circuits 7, 8, is mainly composed of a microprocessor of a per se known construction and is supplied with various signals representing the engine speed (r.p.m.) delivered from a revolution sensor 14, the shift/select set position delivered from a shiftlever sensor 15. the amount of depression of an accelerator pedal delivered from an accelerator pedal sensor 16, and the vehicle speed delivered from a speed sensor (not shown). The main control circuit 13 then computes target positions of the clutch 4 and the gear transmission 3 based on the input signals and respectively provides the first and second actuator operation control circuits 7, 8, with the thus computed target positions in the form of proper signals. The main control circuit 13 further serves to control the operation of an air conditioner, display units and indicators, etc. of the automobile. The main control circuit 13 and the first and second actuator operation control circuits 7, 8 are connected by the above-mentioned first and second exclusive communication cables 17, 18.

Figure 2:
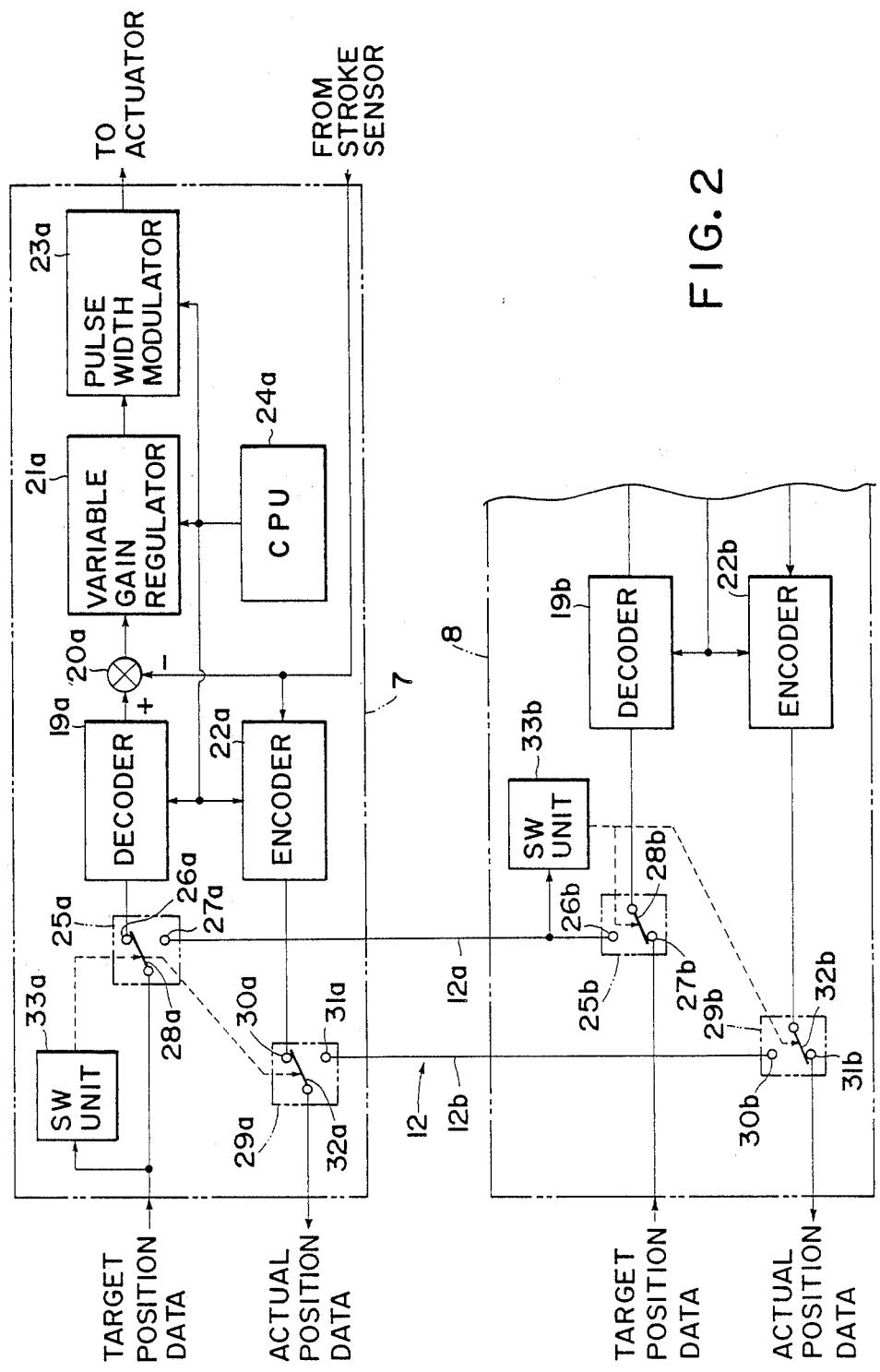
FIG. 2 is a schematic block diagram of a first actuator operation control circuit incorporated in the automatic gear change device shown in FIG. 1.

FIG. 2 shows the general construction of the first actuator operation control circuit 7 and a connecting part or junction between the first and second actuator operation control circuits 7,8 composed of the communication cable 12.

The first actuation operation control circuit 7 includes a decoder 19a for receiving target position data for the clutch 4 delivered from the main control circuit 13 and converting the thus inputted data into corresponding voltage signals. The output signals of the decoder 19a are delivered to a subtractor 20a where they are subtracted with the signal generated by the first stroke sensor 9. The output signal from the subtractor 20a is then inputted to a variable gain regulator 21a. The signal generated by the first stroke sensor 9 is also supplied to an encoder 22a which in turn converts the signal into a predetermined digital code signal. The digital code signal is thereafter transmitted to the main control circuit 13 as actual position data.

The variable gain regulator 21a serves to regulate the input signal into a desired signal level required for operation of the first actuator 5 and supply the thus regulated signal to a pulse-width modulator 23a which in turn converts the signal received into a digital signal to be suppled to the first actuator 5 while regulating the pulse-width of the digital signal thereby achieving a duty factor control of the first actuator 5.

A central processing unit (CPU) 24a is composed of a microprocessor of a per se known construction and serves to control the data transmission/reception timing, error processing and the like.

The second actuator operation control circuit 8 is substantially the same in construction as the first actuator operation control circuit 7 except that it is provided with two sets of the aforesaid components, other than the CPU 24a, since the second actuator 6 is composed of a gear shift actuator member and a gear select actuator member. With this structural similarity in view, a portion of only one set of the components of the second actuator operation control circuit 8 is shown in FIG. 2.

The decoder 19a has an input terminal connected with a first fixed contact 26a of a first changeover device or switch 25a. The encoder 22a has an input terminal connected with a first fixed contact 30a of a second changeover device or switch 29a. The operation of the first and second switches 25a, 29a is controlled by a switching (SW) unit 33a to alternatively connect the decoder 19a and the encoder 22a with the exclusive comminication cable 17 (FIG. 1) or the communication cable 12.

The SW unit 33a serves to changeover the first and second switches 25a, 29a based on a control signal delivered from the main control circuit 13. The first switch 25a has a second fixed contact 27a and a movable contact 28a additional to the first fixed contact 26a. Likewise, the second switch 29a has a second fixed contact 31a and a movable contact 32a additional to the first fixed contact 30a. The second fixed contact 27a of the first switch 25a is connected with a first fixed contact 26a of a first changeover device or switch 25b of the second actuator operation control circuit 8 through a first cable 12a which constitutes one part of the communication cable 12. The second fixed contact 31a of the second switch 29a is connected to a first fixed contact 30b of a second changeover device or switch 29b of the second actuator operation control circuit 8 through a second cable 12b which constitutes the other part of the communication cable 12. Thus, upon receipt of the control signal from the SW unit 33a, the movable contacts 28a, 32a of the first and second switches 25a, 29a are brought into contact with the second fixed contacts 27a, 31a, respectively. At the same time, the control signal from the SW unit 33a changes over movable contacts 28b, 32b of the first and second switches 25b, 29b of the second actuator operation control circuit 8 into contact with the first fixed contacts 26b, 30b. Consequently, data transmission/reception between the second actuator operation control circuit 8 and the main control circuit 13 is performed through the first exclusive communication cable 17, the first actuator operation control circuit 7 and the communication cable 12.

For purposes of illustration, the CPU 24a as shown in FIG. 2 is structurally independent of other components of the first actuator operation control circuit 7, however, in practice, the CPU 24a selfcontains the function of the decoder 19a and other components of the first actuator operation control circuit 7. This is also true in case of the second actuator operation control circuit 8.

Operation of the automatic gear change device of the foregoing construction will be described below with reference to FIGS. 3 through 6.

The data transmission/reception between the main control circuit 13 and the first actuator operation control circuit 7 (or the second actuator operation control circuit 8) is performed in the manner as shown in FIG. 3. At first, target position data for the clutch 4 (or the gear transmission 3) is transmitted from the main control circuit 13 to the first actuator operation control circuit 7 (or the second actuator operation control circuit 8) in the form of serial digital signals for a period of time t1 shown in this figure. Upon completion of this data transmission, the first actuator operation control circuit 7 (or the second actuator operation control circuit 8) transmits the actual set position data (hereinafter referred to as "actual position data") of the clutch 4 (or the gear transmission 3) to the main control circuit 13 in the form of serial digital signals for a period of time t2. Then the main control circuit 13 computes the target position data again based on the actual position data thus transmitted and input signals indicative of various vehicle travelling conditions such as engine r.p.m. After a predetermined period of time T has elapsed, the thus computed target position data are transmitted again to the first actuator operation control circuit 7 (or the second actuator operation control circuit 8). The foregoing cycle of operation is repeated at equal time intervals T.

FIG. 4(a) shows an example of the flow of the control performed in the main control circuit 13 when it transmits the target position data. The main control unit 13 produces offering signals at the aforesaid predetermined intervals T whereupon the control is commenced at a step 100. In the next step 102, a determination is made as to whether or not the reception flag is set. If "YES", i.e. the determination indicates a set condition of the reception flag in which data transmission from the main control circuit 13 is permitted (namely, the data reception is prohibited), the target position data are tansmitted in step 104.

Conversely, if the determination in step 102 shows a reset ("NO") condition of the reception flag in which data transmission is prohibited due to the presence of an accident or trouble in the communication lines between the main control circuit 13 and the first actuator operation control circuit 7 or between the main control circuit 13 and the second actuator operation control circuit 8, the control goes on to step 108. In step 108, a back-up processing is performed to eliminate or remove the trouble. The back-up processing includes determination of the mode of trouble which is achieved by one or more subroutines. Then the control proceeds to step 110 to complete the series of steps of the operation.

After the data transmission in step 104, the control goes on to step 106 in which the reception flag is reset. Thus the main control circuit 13 is placed in a condition ready state for reception of data delivered from the first actuator operation control circuit 7 (or the second actuator operation control circuit 8). The step 106 is followed by the step 110 in which the successive steps of operation come to an end.

FIG. 4(b) is a control flowchart showing the data reception performed by the main control circuit 13.

Upon transmission of actual position data from the first actuator operation control circuit 7 (or the second actuator operation control circuit 8), the main control circuit 13 produces an offering signal in step 112 to permit the reception of signals. Upon production of the offering signal, the control proceeds from step 112 to step 114 in which a reception flag is set to prevent subsequent reception of undesired signals such as noise. Then, a determination is made as to whether or not the reception data are error code in step 116. To achieve this determination, the extent of actual position data which are transmissible from the first actuator operation control circuit 7 (or the second actuator operation control circuit 8) is previously assigned to hexadecimal notation codes, for example, and any other data are assigned to error codes. If the determination shows a condition free of error code, then the control goes on in the direction "NO" to step 118. Conversely, if the determination indicates the presence of an orror code, the control proceeds in the direction "YES" to step 120.

In step 118, the reception data are stored for saving in a predetermined memory. The thus stored reception data are used for computation of new target position data. Thereafter, the control goes on to step 122 to complete the successive steps of the operation.

In the step 120, the reception data assigned to error codes are stored in a predetermined memory. The thus stored error codes are subjected to the back-up processing when the control goes back to the main routine. Then the control proceeds to step 122 to complete the successive steps of the data reception operation.

FIGS. 5(a), 5(b) and 6 show the flow of the control performed in the first actuator operation control circuit 7 (or the second actuator operation control circuit).

In FIG. 5(a), there is shown a control flowchart illustrative of data transmission/reception of the first actuator operation control circuit 7 (or the second actuator operation control circuit 8). When the main control circuit 13 performs data transmission, the first actuator operation control circuit 7 (or the second actuator operation control circuit 8) produces an offering signal for permitting data reception whereupon the control is commenced in step 130. In the next step 132, a reception flag is set in the same manner as done in step 114 stated above, and the control proceeds to step 133.

In step 133, a determination is made as to whether or not the input data relate to the first actuator operation control circuit 7 or the second actuator operation control circuit 8. If the input data are determined as being related to the first actuator operation control circuit 7, then the control goes on in the direction "YES" to step 134. Conversely, if the input data are determined as being related to the other control circuit 8, then the control proceeds in the direction "NO" to step 160.

Step 134 and steps 136 and 138 are identical to the aforesaid steps 116, 118 and 120, respectively, and hence require no further description.

Subsequent to step 136, the actual position data are transmitted in step 140 and the control goes on to step 144 to complete the processing operation.

Step 138 is followed by step 142 in which indication data are transmitted to indicate that a back-up processing to be performed in the presence of an error code in the reception data is now in progress. Thereafter, the control goes on to step 144 to complete the processing operation.

In step 160, the reception data are transmitted through the first cable 12a to the second actuator operation control circuit 8 dependent on the result of determination in step 133. Stated more specifically, if the determination in step 133 indicates a "NO" condition, the SW unit 33a of the first actuator operation control circuit 7 produces an output signal to changeover the positions of the respective movable contacts 28a, 32a of the first and second switches 25a, 29a from the connection with the first fixed contacts 26a, 30a to the connection with the second fixed contacts 27a, 31a, thereby permitting data transmission as stated above (a control flow performed in the second actuator operation control circuit 8 will be described later with reference to FIG. 6). Then the control goes on to step 162 in which the reception of the actual position data delivered from the second actuator operation control circuit 8 is performed. The actual position data thus received are then transmitted to the main control circuit 13 in step 164. Then the control goes on to step 144 to complete the pocessing operation.

After the completion of the successive steps of operation in step 144, the control returns to the main routine in which a control signal is supplied to the clutch 4 (or the gear transmission 3) to place the latter in the target position.

FIG. 5(b) shows the flow of the control flow which is performed prior to the data reception of the first actuator operation control circuit 7 (or the second actuator operation control circuit 8). The control is commenced in step 146 and then goes on to step 148 in which a determination is made as to whether or not a reception flag is set.

If the reception flag is set to thereby prohibit data reception, the control proceeds in the direction "YES" to step 154 in which the reception flag is reset, thereby permitting data reception. Step 154 is followed by step 156 in which the control operation is completed. Thereafter the control goes on to a non-illustrated main routine in which successive steps of operation are performed in the same manner as done in the control routine shown in FIG. 4(a).

If the determination in step 148 shows a reset ("NO") condition of the reception flag, the control goes on to step 150 in which a back-up flag is set. Since this control routine is performed before the first actuator operation control circuit 7 (or the second actuator operation control circuit 8) is set in a condition ready for data reception, the reset condition of the reception flag which is determined in step 146 means that the first actuator operation control circuit 7 (or the second actuator operation control circuit 8) which should be held in a condition to prohibit data reception is placed in a condition to accept data reception due to the absence of data transmission from the main control circuit 13. Consequently, a back-up flag is set as a mark or sign so as to indicate a defective condition for proceeding a back-up processing in the main routine, not illustrated here.

Step 150 is followed by step 152 in which an error code indicative of the occurrence of an accident or trouble in a communication line between the main control circuit 13 and the first actuator operation control circuit 7 (or the second actuator operation control circuit 8) is transmitted to the main control circuit 13. Then the control goes on to step 156 to complete the processing operation.

FIG. 6 shows the flow of the control for performing data transmission/reception between the second actuator operation control circuit 8 (or the first actuator operation control circuit 7) and the main control circuit 13 through the communication cable 12. The control is commenced in step 168 and then goes on to step 170 in which a determination is made as to whether or not the reception data have departed from the first actuator operation control circuit 7 for back-up processing. If "YES", the control proceeds to step 172 in which the SW unit 33b changes over the movable contacts 28b, 32b of the first and second switches 25b, 29b into engagement with the first fixed contacts 26b, 30b to thereby store the reception data in a predetermined memory. Then the control goes on to step 174.

In step 174, the actual position data on the clutch 4 (or the gear transmission 3) are fed from the second actuator operation control circuit 8 successively throught the second cable 12b, the first actuator operation control circuit 7 and the first exclusive cable 17 to the main control circuit 13.

The data transmission/reception between the first actuator operation control circuit 7 and the main control circuit 13 via the communication cable 12 is performed in essentially the same manner as the above-mentioned data transmission/reception.

In the illustrated embodiment, the connection between the communication cable 12 and the first and second actuator operation control units 7, 8 is provided for the data transmission/reception between the second actuator operation control circuit 8 and the main control circuits 13 via the communication cable 12. The connection or junction between the communication cable 12 and the first and second actuator operation control units 7, 8 for enabling data transmission/reception between the first actuator operation control circuit 7 and the main control circuit 13 through the communication cable 12 is not illustrated but such data transmission/reception can be performed by providing an additional set of connecting components which is the same as the connection component set shown in FIG. 2.

Obviously, various modifications and variations of the present invention are possible in the light of the above teachings. It is therefore to be understood that within the scope of the appended claims the invention may be practiced otherwise than as specifically described.

What is claimed is:

1. An automatic gear change device for controlling the operation of a gear transmission and a clutch, said clutch for engaging and disengaging said gear transmission, said device comprising:

a first actuator connected to said clutch, said first actuator operating said clutch in response to a first actuator signal;

a second actuator connected to said gear transmission, said second actuator operating said gear transmission in response to a second actuator signal;

a first actuator operation control means, connected to said first actuator, for outputting said first actuator signal in response to target data;

a second actuator operation control means, connected to said second actuator, for outputting said second actuator signal in response to said target data;

a main control means, connected to said first actuator operation control means by a first signal path and connected to said second operation control means by a second signal path, for outputting said target data;

a communication means for electrically interconnecting said first actuator operation control means and said second actuator operation control means;

a first stroke sensor connected to said first actuator and said first actuator operation control means, said first stroke sensor outputting to said first actuator operation control means a first position signal in accordance with a stroke of said first actuator; and, a second stroke sensor connected to said second actuator and said second actuator operation control means, said second stroke sensor outputting to said second actuator operation control means a second position signal in accordance with a stroke of said second actuator;

wherein a first electrical signal path is established between said main control means and said first actuator operation control means through said second signal path and said second actuator operation control means and said communication means when said first signal path is inoperative;

wherein a second electrical signal path is established between said main control means and said second actuator operation control means through said first signal path and said first actuator operation control means and said communication means when said second signal path is inoperative; and, wherein said first and second actuator operation control means respectively output first and second position data to said main control means, said first and second position data respectively corresponding to said first and second position signals.

2. An automatic gear change device as claimed in claim 5, said first actuator operation control means comprising:

a decoder for converting said target data received from said main control means into corresponding electrical signals;

a variable gain regulator connected to said decoder for converting each of said electrical signals to a corresponding signal having a predetermined voltage level;

a pulse-width modulator connected to said variable gain regulator for modulating the pulse-width of said signal having a predetermined voltage level and for supplying the thus generated modulated signal to said first actuator; and an encoder connected to said first stroke sensor for outputting said first position data in response to said first position signal.

3. An automatic gear change device as claimed in claim 1, wherein said first actuator operation control means comprises a switching unit for selectively establishing an electrical signal path between said main control means and said first actuator operation control means, and between said second actuator operation control means and said first actuator operation control means.

4. An automatic gear change device as claimed in claim 2, wherein said first actuator operation control means further comprises a switching unit for selectively establishing an electrical signal path between said main control means and said first actuator operation control means, and between said second actuator operation control means and said first actuator operation control means.

5. An automatic gear change device as claimed in claim 4, wherein said first actuator operation control means further comprises a central processing unit for controlling the operation of said decoder, said variable gain regulator, said pulse-width modulator, said encoder, and said switching unit.

* * * * *